(12) United States Patent
He et al.

(10) Patent No.: US 8,104,169 B2
(45) Date of Patent: Jan. 31, 2012

(54) AUTOMATIC ASSEMBLY JIG

(75) Inventors: Yun-Feng He, Shanghai (CN); Hua-Yin Zhang, Shanghai (CN); Bin Zhao, Shanghai (CN)

(73) Assignee: Inventec Appliances Corp., New Taipei (TW)

( * ) Notice: Subject to any disclaimer, the term of this patent is extended or adjusted under 35 U.S.C. 154(b) by 170 days.

(21) Appl. No.: 12/624,683

(22) Filed: Nov. 24, 2009

(65) Prior Publication Data

US 2010/0126005 A1   May 27, 2010

(30) Foreign Application Priority Data

Nov. 24, 2008  (TW) ................................ 97145334 A

(51) Int. Cl.
   *B23B 19/00*   (2006.01)
   *B25B 27/02*   (2006.01)
(52) U.S. Cl. ............. 29/760; 29/729; 29/739; 29/281.3; 29/281.4
(58) Field of Classification Search .................... 29/729, 29/739, 760, 281.3–281.4
See application file for complete search history.

(56) References Cited

U.S. PATENT DOCUMENTS

| | | | | |
|---|---|---|---|---|
| 3,727,284 A * | 4/1973 | Ragard et al. | | 227/2 |
| 3,837,063 A * | 9/1974 | Wright | | 227/2 |
| 5,031,312 A * | 7/1991 | Culbertson et al. | | 29/828 |
| 5,174,004 A * | 12/1992 | King et al. | | 29/251 |
| 5,289,633 A * | 3/1994 | Okafuji et al. | | 29/850 |
| 5,848,458 A * | 12/1998 | Bullen | | 29/33 K |
| 6,305,076 B1 * | 10/2001 | Bright | | 29/837 |
| 2010/0126005 A1 * | 5/2010 | He et al. | | 29/760 |

* cited by examiner

*Primary Examiner* — Minh Trinh
(74) *Attorney, Agent, or Firm* — J.C. Patents

(57) ABSTRACT

An automatic assembly jig adapted for assembling an electronic component and a case is provided. The jig includes a working platform, a carrier, a pressure exerting device and at least a gear. The working platform has a guiding rail. The carrier is disposed on the working platform and is slidably mounted on the guiding rail. The pressure exerting device is disposed above the working platform. The gear is disposed on the working platform and connected with the carrier, so as to drive the carrier moving along the guiding rail to the position under the pressure exerting device.

14 Claims, 2 Drawing Sheets

AUTOMATIC ASSEMBLY JIG

CROSS-REFERENCE TO RELATED APPLICATION

This application claims the priority benefit of Taiwan application serial no. 97145334, filed on Nov. 24, 2008. The entirety of the above-mentioned patent application is hereby incorporated by reference herein and made a part of this specification.

BACKGROUND OF THE INVENTION

1. Field of the Invention

The present invention relates to an assembly jig, and more particularly, to an automatic assembly jig for assembling an electronic component to a case.

2. Description of Related Art

Following vigorous development of electronic technology, new electronic products are being continuously introduced into the market. Ordinary users also have increasingly higher demand on the electronic products. In the aspect of manufacturing, assembly of common electronic components, such as liquid crystal display modules (LCM), to cases is often performed manually. Specifically, an operator needs to hold the product with both hands and press the LCM with thumbs, so as to connect the LCM with the case. However, when the operator is pressing the LCM to connect the LCM with the case, it is difficult to control the pressing force. In addition, the operator's fingers only contact a limited area of the electronic component such that the force applied to the electronic component and the case is non-uniform. Consequently, the electronic component becomes disengaged from the case during subsequent processing, or even the damage probability of the electronic product during assembly is increased. Moreover, the manual assembly has a low efficiency and causes waste of manpower and material resources. Facing the keen competition in the electronic product market, it is very important to increase the efficiency of electronic product assembly and production yield rate so as to increase the company's competitiveness as well as satisfy the market's requirements.

SUMMARY OF THE INVENTION

Accordingly, the present invention is directed to an automatic assembly jig capable of increasing the throughput.

The present invention provides an automatic assembly jig adapted for assembling an electronic component and a case. The automatic assembly jig comprises a working platform, a carrier, a pressure exerting device, and at least one gear. The working platform comprises a guiding rail. The carrier is disposed on the working platform and slidably disposed on the guiding rail. The pressure exerting device is disposed above the working platform. The gear is disposed on the working platform and connected to the carrier to drive the carrier moving along the guiding rail to the position under the pressure exerting device.

According to one embodiment of the present invention, the working platform has a top surface and a bottom surface. The guiding rail, the carrier and the pressure exerting device are disposed on the top surface. The gear is disposed on the bottom surface.

According to one embodiment of the present invention, the working platform has at least one slot. The gear connects with the carrier through the slot so as to drive the carrier moving.

According to one embodiment of the present invention, the guiding rail comprises a plurality of rollers which connect with the carrier.

According to one embodiment of the present invention, the guiding rail extends from a position under the pressure exerting device to outside the position.

According to one embodiment of the present invention, the guiding rail is a linear guiding rail.

According to one embodiment of the present invention, the carrier comprises a carrying member and a sliding member. The carrying member has a receiving space for receiving the case and is connected with the gear. The sliding member is fixed at a bottom of the carrying member and slidably disposed on the guiding rail.

According to one embodiment of the present invention, the carrying member has a recess defined in the bottom thereof, and the sliding member is fixed in the recess.

According to one embodiment of the present invention, the pressure exerting device comprises a pressing unit, a floating plate, and a pressing head. The pressing unit is disposed above the working platform. The floating plate is connected between the pressing unit and the pressing head. The pressing unit is adapted to drive the pressing head moving toward the carrying member.

According to one embodiment of the present invention, the pressing unit comprises a supporting bracket disposed on the working platform, and a vertical cylinder disposed on the supporting bracket.

According to one embodiment of the present invention, the automatic assembly jig further comprises a plurality of first guiding bearings and a plurality of second guiding bearings. The first guiding bearings are connected between the supporting bracket and the working platform. The floating plate has a plurality of first holes. The first guiding bearings penetrate through the first holes. The second guiding bearings are connected between the supporting bracket and the floating plate. The supporting bracket has a plurality of second holes. The second guiding bearings penetrate through the second holes.

According to one embodiment of the present invention, the gear comprises at least one horizontal cylinder and at least one connecting part connected between the horizontal cylinder and the carrier.

According to one embodiment of the present invention, the working platform has at least one slot, and the connecting part of the gear is connected with the carrier by penetrating through the slot.

According to one embodiment of the present invention, the automatic assembly jig further comprises at least one first sensor disposed by the side of the horizontal cylinder to sense a state of the horizontal cylinder.

According to one embodiment of the present invention, the automatic assembly jig further comprises at least one second sensor disposed by the side of the pressure exerting device to sense a state of the pressure exerting device.

According to one embodiment of the present invention, the automatic assembly jig further comprises a position limiter disposed on the working platform to limit movement of the carrier.

In view of the foregoing, the automatic assembly jig of the present invention can assemble electronic components to cases, thereby increasing the throughput and reducing the manufacturing cost.

In order to make the aforementioned and other features and advantages of the present invention more comprehensible, embodiments accompanied with figures are described in detail below.

DESCRIPTION OF THE EMBODIMENTS

Figure 1A:
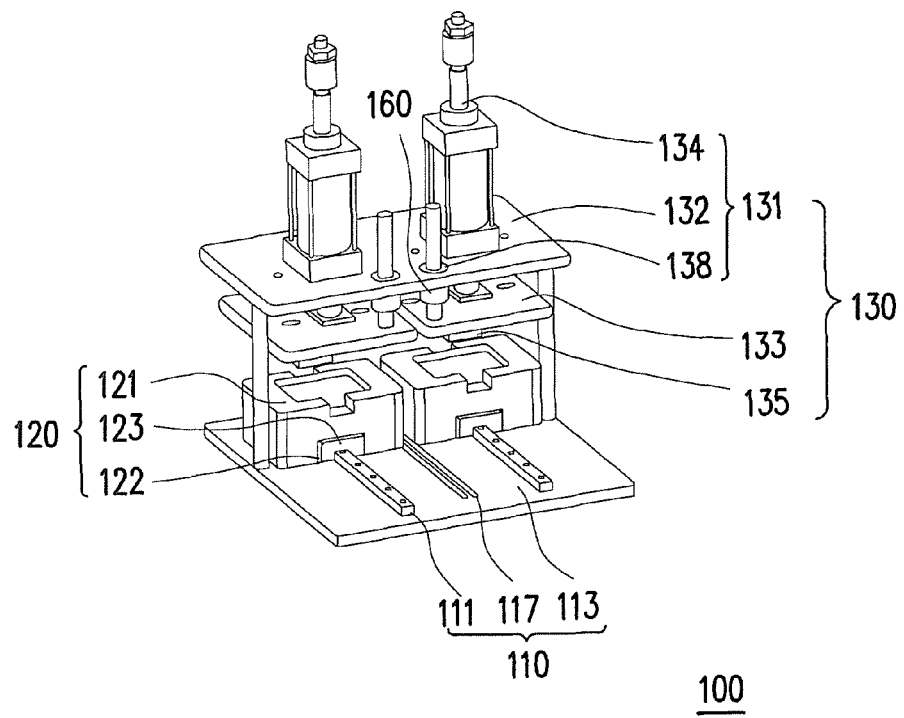
FIGS. 1A and 1B illustrate the structure of an automatic assembly jig according to one embodiment of the present invention.
Figure 1B:
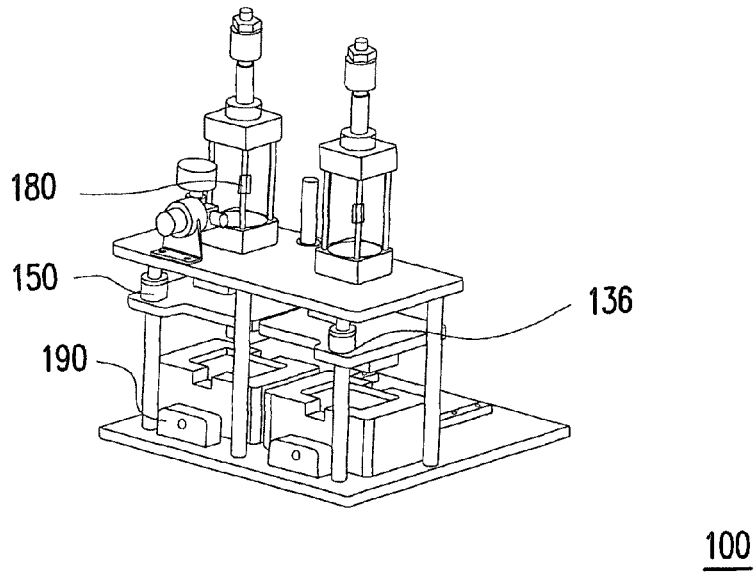
Figure 2:
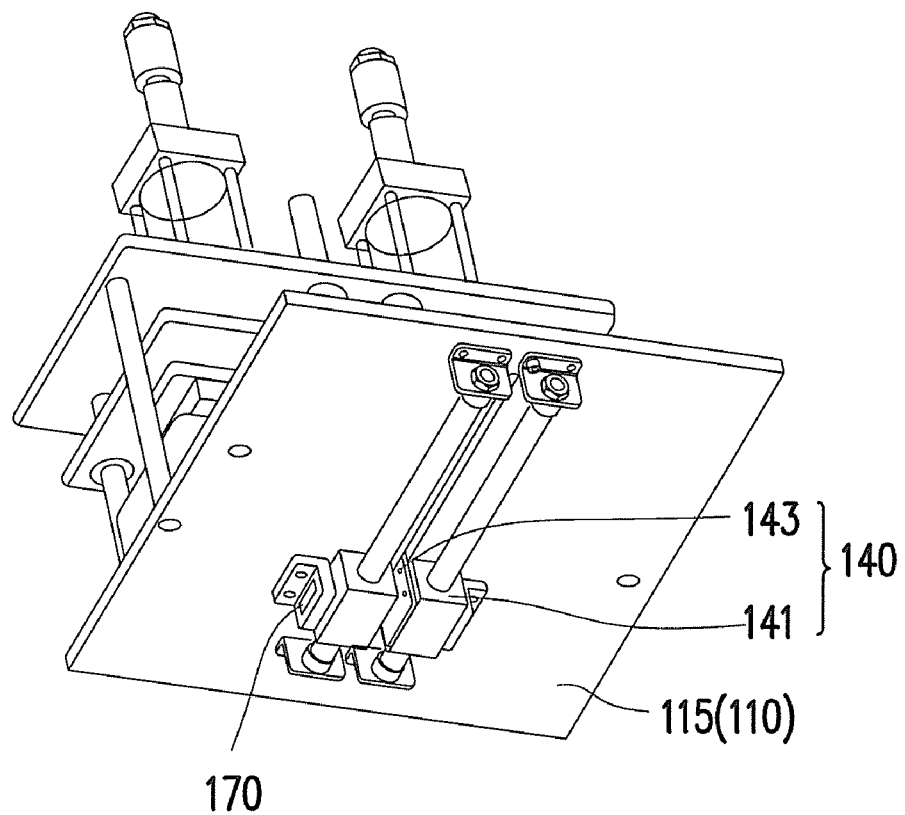
FIG. 2 is a bottom view of the automatic assembly jig of FIGS. 1A and 1B.

FIGS. 1A and 1B illustrate the structure of an automatic assembly jig according to one embodiment of the present invention, and FIG. 2 is a bottom view of the automatic assembly jig of FIGS. 1A and 1B. Referring to FIGS. 1A, 1B and 2, the automatic assembly jig 100 of the present embodiment includes a working platform 110, two carriers 120, two pressure exerting devices 130, and two gears 140. In this embodiment, the automatic assembly jig 100 includes two carriers 120, two pressure exerting devices 130 and two gears 140 for elaboration only but not for limiting the scope of the invention. That is, in another embodiment, the automatic assembly jig includes one carrier, one pressure exerting device and one gear. Or, in the other embodiment, the automatic assembly jig includes more than two carriers, more than two pressure exerting devices and more than two gears.

The pressure exerting devices 130 are disposed above the working platform 110. The working platform 110 has two guiding rails 111 thereon. In this embodiment, the working platform 110 includes two guiding rails 111 for elaboration only but not for limiting the scope of the invention. That is, in another embodiment, the working platform has one or more than two guiding rails. Each guiding rail 111 is mounted with one of the carriers 120 correspondingly. Each carrier 120 is connected to one of the gears 140 mounted on the working platform 110 correspondingly. Consequently, the carriers 120 can be driven by the gears 140 moving along the guiding rails 111 to the position under the pressure exerting devices 130. In the present embodiment, the guiding rails 111, the carriers 120 and the pressure exerting devices 130 are located on a top surface 113 of the working platform 110, and the gears 140 are located on a bottom surface 115 of the working platform 110. The working platform 110 defines at least one slot 117. The gears 140 connect with the carriers 120 on the top surface 113 of the working platform 110 through the slot 117.

Referring to FIG. 2, each of the gears 140 of the present embodiment includes at least one horizontal cylinder 141 and at least one connecting part 143. The connecting part 143 penetrates through the slot 117 of the working platform 110 to interconnect one of the carriers 120 and the horizontal cylinder 141. Therefore, with the connecting part 143 interconnecting one of the carriers 120 and the horizontal cylinder 141, the corresponding carrier 120 can move horizontally with the horizontal cylinder 141.

In the present embodiment, the guiding rails 111 are linear guiding rails which extend from a position under the pressure exerting devices 130 to outside of the position, so as to define a movement path of the carriers 120 between an assembly area (the area under the pressure exerting device 130) and a non-assembly area. Each of the carriers 120 includes a carrying member 121 and a sliding member 123. The carrying member 121 can receive the case. When a different product is assembled, the receiving space of the carrying member 121 can be varied to become adapted to the profile of the case. In addition, the carrier 121 is connected to one of the gear 140 and has a recess 122 formed in a bottom of the carrier 121. The sliding member 123 is fixed in the recess 122 so as to be connected with the carrying member 121. When one of the gears 140 drives the corresponding carrying member 121 to move, the sliding member 123 disposed on the guiding rail 111 moves along the guiding rail 111, thus driving the entire corresponding carrier 120 to move horizontally in a forward or backward direction. The guiding rail 111 can optionally be provided with rollers (not shown) to reduce friction between the sliding member 123 and the guiding rail 111, thus achieving smoother sliding movement of the sliding member 123.

The automatic assembly jig 100 further includes a position limiter 190. When one of the carriers 120 slides along the guiding rail 111 to a desired position shown in FIGS. 1A and 1B, the position limiter 190 can be used to adjust the position of the corresponding carrier 120 in the forward and backward directions on the horizontal plane. The position limiter 190 can optionally be provided with a longitudinally retractable element, such as a spring-loaded pin. This longitudinally retractable element can be used to correct the position of the corresponding carrier 120 on the working platform so as to increase alignment accuracy during assembly. When the corresponding carrier 120 slides to the desired position, the retractable element may also reduce the impact of the corresponding carrier 120 on the position limiter 190. Thus, the retractable element may act as a buffer which reduces the possibilities of damaging the automatic assembly jig 100 and the case.

Each of the pressure exerting devices 130 of the present embodiment includes a pressing unit 131, a floating plate 133 and a pressing head 135. The pressing head 135 may be fastened to a bottom of the floating plate 133 by, for example, using screws. Screw holes for fastening the pressing head 135 may be expanded in cross-section along leftward and rightward directions. In other words, the shape of the screw holes may be oval or of other types such that leftward and rightward fine adjustments of the screws on the horizontal plane are permitted during fastening the pressing head 135. Therefore, the oval holes or other types of holes and the position limiter 190 can further facilitate the alignment of the carriers 121 with the pressing head 135.

The pressing unit 131 is disposed above the working platform 110 and includes a supporting bracket 132 and a vertical cylinder 134. The supporting bracket 132 is mounted on the working platform 110. The vertical cylinder 134 is disposed on the supporting bracket 132 and connected with the floating plate 133. As such, when moving upward or downward, the vertical cylinder 134 can drive the float plate 133 to move upward or downward such that the pressing head 135 can make upward and downward movements above the working platform 110.

In order to calibrate horizontality of the floating plate 133 so as to maintain the floating plate 133 to be horizontal when the floating plate 133 is being pressed and ensure that force is uniformly applied on the product during assembly, the automatic assembly jig 100 of the present embodiment can optionally be provided with a plurality of first guiding bearings 150 and a plurality of second guiding bearings 160. The first guiding bearings 150 are connected between the supporting bracket 132 and the working platform 110. The floating plate 133 has a plurality of first holes 136. The first guiding bearings 150 penetrate through the first holes 136. As shown in FIGS. 1A and 1B, the second guiding bearings 160 are connected between the supporting bracket 132 and the floating plate 133. The supporting bracket 132 has a plurality of second holes 138. The second guiding bearings 160 penetrate through the second holes 138.

In the present embodiment, the automatic assembly jig 100 further includes at least one first sensor 170 disposed by the side of the horizontal cylinder 141 for sensing a state of the horizontal cylinder 141. Moreover, the automatic assembly jig 100 further includes at least one second sensor 180 positioned by the side of the pressure exerting devices 130 for sensing a state of the pressure exerting devices 130. The horizontal cylinder 141 and the vertical cylinder 134 of the present embodiment may both be controlled by, for example, solenoid valves. Once an activation button of the automatic assembly jig 100 is pressed, the solenoid valve for controlling the horizontal cylinder 141 causes the horizontal cylinder 141 to drive the corresponding carrier 120 sliding to a desired position which is sensed by the first sensor 170. Upon sensing the horizontal cylinder 141 (e.g., a magnetic ring on the horizontal cylinder), the first sensor 170 is triggered to transmit through a control circuit a signal which energizes the solenoid valve of the vertical cylinder 134, such that the vertical cylinder 134 drives the pressing head 135 to move downward and a time delay procedure is initiated simultaneously. When the time delay procedure ends, the control end operates to de-energize the solenoid valve of the vertical cylinder 134. At this time, the vertical cylinder 134 is restored to its original position and, when restored to its original position, the vertical cylinder 134 triggers the second sensor 180 to de-energize the solenoid valve of the horizontal cylinder 141. At this time, the horizontal cylinder 141 drives the corresponding carrier 120 back to its original position prior to the activation. One cycle of the pressing procedure is thus completed. When pressing downward, the vertical cylinder 134 also triggers the second sensor 180. However, a limited condition is used during the control, such that triggering the second sensor 170 does not restore the horizontal cylinder 141 to its original position until the time delay procedure ends.

It should be noted that the pressure exerting devices 130 may provide different pressing forces for assembly of different products. Therefore, in the other embodiment, an extra control device such as a throttle valve can be used to adjust the pressing force provided by the pressure exerting devices 130 during pressing process.

As described above, the pressing head 135 of the automatic assembly jig 100 can be designed according to the profile of different cases, such that the force applied on the case of the product and the electronic component during assembly can be more uniform than the force generated during manual assembly. Therefore, the likelihood of the case of the product or the electronic component being damaged during assembly due to non-uniform forces can be reduced and the production yield is hence increased. Besides, the carrier 121 and the pressing head 135 can easily be detached and replaced, such that the carrier 121 and the pressing head 132 can be replaced with suitable ones for assembly of different products. Thus, the automatic assembly jig 100 of the present embodiment has a high utility.

In summary, the present invention utilizes a working platform, a carrier, a pressure exerting device and at least one gear to automatically perform assembly of electronic component and case, thereby increasing the throughput of the conventional assembly jig. Furthermore, the present invention with a plurality of carriers, a plurality of pressure exerting devices and a plurality of gears can achieve greater throughput by performing assembly of multiple groups of electronic component and case simultaneously.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An automatic assembly jig adapted for assembling an electronic component and a case, comprising:
    a working platform having a guiding rail;
    a carrier disposed on the working platform, wherein the carrier is slidably disposed on the guiding rail;
    a pressure exerting device disposed above the working platform;
    at least one gear disposed on the working platform and connected to the carrier, for causing the carrier to slide along the guiding rail into a position under the pressure exerting device; and
    a position limiter disposed on the working platform to limit movement of the carrier.

2. The automatic assembly jig according to claim 1, wherein the working platform has a top surface and a bottom surface, and the guiding rail, the carrier and the pressure exerting device are disposed on the top surface, and the gear is disposed on the bottom surface.

3. The automatic assembly jig according to claim 2, wherein the working platform has at least one slot, and the gear connects to the carrier through the slot so as to slide the carrier.

4. The automatic assembly jig according to claim 1, wherein the guiding rail extends from under the pressure exerting device to a position not under the pressure exerting device.

5. The automatic assembly jig according to claim 1, wherein the guiding rail is a linear guiding rail.

6. The automatic assembly jig according to claim 1, wherein the carrier comprises:
    a carrying member having a receiving space for receiving the case, the carrying member connected with the gear; and
    a sliding member fixed at a bottom of the carrying member, the sliding member slidably disposed on the guiding rail.

7. The automatic assembly jig according to claim 6, wherein the carrying member has a recess defined in the bottom thereof, and the sliding member is fixed in the recess.

8. The automatic assembly jig according to claim 6, wherein the pressure exerting device comprises:
    a pressure exerting unit disposed above the working platform;
    a floating plate; and
    a pressure exerting head, wherein the floating plate is connected between the pressure exerting unit and the pressure exerting head, and the pressure exerting unit is suitable for moving the pressure exerting head toward the carrying member.

9. The automatic assembly jig according to claim 8, wherein the pressure exerting unit comprises:
    a bracket disposed on the working platform; and
    a vertical cylinder disposed on the bracket.

10. The automatic assembly jig according to claim 9, further comprising:
    a plurality of first guiding bearings connected between the bracket and the working platform, wherein the floating plate has a plurality of first holes, and the first guiding bearings penetrate through the first holes; and
    a plurality of second guiding bearings connected between the bracket and the floating plate, wherein the bracket has a plurality of second holes, and the second guiding bearings penetrate through the second holes.

11. The automatic assembly jig according to claim 1, wherein the gear comprises:
   at least one horizontal cylinder; and
   a connection between the horizontal cylinder and the carrier.

12. The automatic assembly jig according to claim 11, wherein the working platform has at least one slot, and the connection of the gear is connected to the carrier by penetrating through the slot.

13. The automatic assembly jig according to claim 11, further comprising at least one first sensor disposed beside the horizontal cylinder to sense a state of the horizontal cylinder.

14. The automatic assembly jig according to claim 1, further comprising at least one second sensor disposed beside the pressure exerting device to sense a state of the pressure exerting device.

* * * * *